(12) United States Patent  (10) Patent No.: US 8,422,428 B1
Hilyard et al.  (45) Date of Patent: Apr. 16, 2013

(54) DEVICE MANAGEMENT FOR A WIRELESS COMMUNICATION DEVICE HAVING AND INVALID USER IDENTIFIER

(75) Inventors: Trey A. Hilyard, Olathe, KS (US); Robert L. Spanel, Overland Park, KS (US); Trevor Daniel Shipley, Olathe, KS (US); Cesar Perez, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 393 days.

(21) Appl. No.: 12/885,646

(22) Filed: Sep. 20, 2010

(51) Int. Cl.
*H04W 4/00* (2009.01)
(52) U.S. Cl.
USPC .......................................... 370/328; 370/338
(58) Field of Classification Search .......... 370/310–350, 370/395.2
See application file for complete search history.

(56) References Cited

U.S. PATENT DOCUMENTS

| | | | |
|---|---|---|---|
| 6,725,056 B1 | 4/2004 | Moles et al. | |
| 7,072,653 B1 | 7/2006 | Sladek et al. | |
| 7,197,301 B2 | 3/2007 | Netanel | |
| 7,324,474 B2 | 1/2008 | Shirota et al. | |
| 2003/0096625 A1 | 5/2003 | Lee et al. | |
| 2003/0139175 A1 | 7/2003 | Kim | |
| 2004/0133623 A1 | 7/2004 | Murtagh et al. | |
| 2005/0282559 A1 | 12/2005 | Erskine et al. | |
| 2007/0169093 A1 | 7/2007 | Logan et al. | |
| 2008/0026740 A1 | 1/2008 | Netanel | |
| 2008/0107083 A1 | 5/2008 | Shirota et al. | |
| 2010/0009659 A1 | 1/2010 | Netanel et al. | |
| 2010/0173609 A1 | 7/2010 | Netanel et al. | |

*Primary Examiner* — Warner Wong (57) ABSTRACT

A method of operating a communication system comprises, in a user identifier database system, identifying a failed registration attempt by a wireless communication device to register with a communication network based on a device identifier, identifying a routing system associated with the failed registration attempt, and transferring a data service message for delivery to the routing system, wherein the data service message comprises the device identifier, a service identifier, and instructions for a data session. The method further comprises, in the routing system, creating a temporary profile for the wireless communication device based on the service identifier and transferring the instructions for the data session for delivery to the wireless communication device. The method further comprises, in the wireless communication device, processing the instructions for the data session and transferring a session request for delivery to the routing system to establish the data session with a device management system identified in the instructions, and in the device management system, performing a device management task on the wireless communication device.

20 Claims, 6 Drawing Sheets

DEVICE MANAGEMENT FOR A WIRELESS COMMUNICATION DEVICE HAVING AND INVALID USER IDENTIFIER

TECHNICAL BACKGROUND

To establish a communication session with a wireless access network, a user typically operates a wireless communication device to communicate in a wireless protocol with a wireless access node. The wireless access node then exchanges the user communications with other systems of the wireless access network, such as gateways, service nodes, and mobile switching centers, to ultimately provide a communication service, such as telephony voice communications or data access over the Internet.

However, in order to establish the communication session with the wireless network, the wireless communication device is typically required to first successfully register with the network. Device registration to establish a communication session often involves the wireless network receiving registration data from the wireless communication device attempting to register, such as device and user identifiers associated with the device and/or its user. In order to grant or deny the session request, a communication system in the wireless network accesses a database system, such as a home location register (HLR) or visitor location register (VLR), to retrieve user and device identifiers corresponding to the wireless communication device attempting to register. Typically, the database contains a matched set of device and user identifiers, such as an electronic serial number (ESN) or mobile equipment identifier (MEID) to identify the device, correlated with a mobile station identifier (MSID) associated with the user. If the user and device identifiers provided by the wireless communication device are valid and match the information in the wireless network database, the device is granted access to the wireless network and the communication session is established. However, if the wireless communication device provides an invalid user identifier that does not match the device identifier, the information in the wireless network database will not match and the communication session request is denied.

Functions related to device management are typically handled by a device management client application installed on the wireless communication device. The device management client communicates with a device management system typically located in back-office systems of a wireless communication network to provide various services, such as device provisioning, activation, configuration, software upgrades, and fault management. Critical parameters are typically passed from the device management system to the wireless communication device to support these functions using over-the-air (OTA) device management protocols, such as open mobile alliance device management (OMA-DM) or over-the-air service provisioning (OTASP). However, in order to receive OTA device management, the wireless communication device typically needs to be able to successfully register with the wireless communication network to establish a data session with the device management system.

OVERVIEW

A method of operating a communication system comprises, in a user identifier database system, receiving a notification of a first failed attempt by a wireless communication device to register with a communication network using an invalid user identifier, wherein the notification includes a device identifier that identifies the wireless communication device. The method further comprises, in the user identifier database system, identifying, based on the device identifier, a second failed attempt by the wireless communication device to register with the communication network, identifying a routing system associated with the second failed attempt, and transferring a data service message for delivery to the routing system responsive to the second failed attempt, wherein the data service message comprises the device identifier, a service identifier, and instructions for a data session. The method further comprises, in the routing system, creating a temporary profile for the wireless communication device based on the service identifier and transferring the instructions for the data session for delivery to the wireless communication device, wherein the temporary profile enables the wireless communication device to access the communication network using the device identifier for a predetermined time period. The method further comprises, in the wireless communication device, processing the instructions for the data session and transferring a session request for delivery to the routing system to establish the data session with a device management system identified in the instructions, wherein the session request includes the device identifier. The method further comprises, in the routing system, processing the device identifier with the temporary profile to determine whether the wireless communication device is authorized to access the communication network, and if the wireless communication device is authorized, allowing the wireless communication device to establish the data session with the device management system. The method further comprises, in the device management system, performing a device management task on the wireless communication device.

A communication system comprises a user identifier database system, a routing system, a wireless communication device, and a device management system. The user identifier database system is configured to receive a notification of a first failed attempt by a wireless communication device to register with a communication network using an invalid user identifier, wherein the notification includes a device identifier that identifies the wireless communication device. The user identifier database system is configured to identify, based on the device identifier, a second failed attempt by the wireless communication device to register with the communication network, to identify a routing system associated with the second failed attempt, and to transfer a data service message for delivery to the routing system responsive to the second failed attempt, wherein the data service message comprises the device identifier, a service identifier, and instructions for a data session. The routing system is configured to create a temporary profile for the wireless communication device based on the service identifier and transfer the instructions for the data session for delivery to the wireless communication device, wherein the temporary profile enables the wireless communication device to access the communication network using the device identifier for a predetermined time period. The wireless communication device is configured to process the instructions for the data session and transfer a session request for delivery to the routing system to establish the data session with a device management system identified in the instructions, wherein the session request includes the device identifier. The routing system is configured to process the device identifier with the temporary profile to determine whether the wireless communication device is authorized to access the communication network, and if the wireless communication device is authorized, to allow the wireless communication device to establish the data session with the device management system. The device management system is configured to perform a device management task on the wireless communication device.

A method of operating a communication system comprises, in a database system, identifying a failed registration attempt by a wireless communication device to register with a communication network based on a device identifier that identifies the wireless communication device. The method further comprises, in the database system, identifying a routing system associated with the failed registration attempt, and transferring a data service message for delivery to the routing system responsive to the failed registration attempt, wherein the data service message comprises the device identifier, a service identifier, and instructions for a data session. The method further comprises, in the routing system, creating a temporary profile for the wireless communication device based on the service identifier and transferring the instructions for the data session for delivery to the wireless communication device, wherein the temporary profile enables the wireless communication device to access the communication network using the device identifier for a predetermined time period. The method further comprises, in the wireless communication device, processing the instructions for the data session and transferring a session request for delivery to the routing system to establish the data session with a device management system identified in the instructions, wherein the session request includes the device identifier. The method further comprises, in the routing system, processing the device identifier with the temporary profile to determine whether the wireless communication device is authorized to access the communication network, and if the wireless communication device is authorized, allowing the wireless communication device to establish the data session with the device management system. The method further comprises, in the device management system, remotely erasing user data stored on the wireless communication device.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
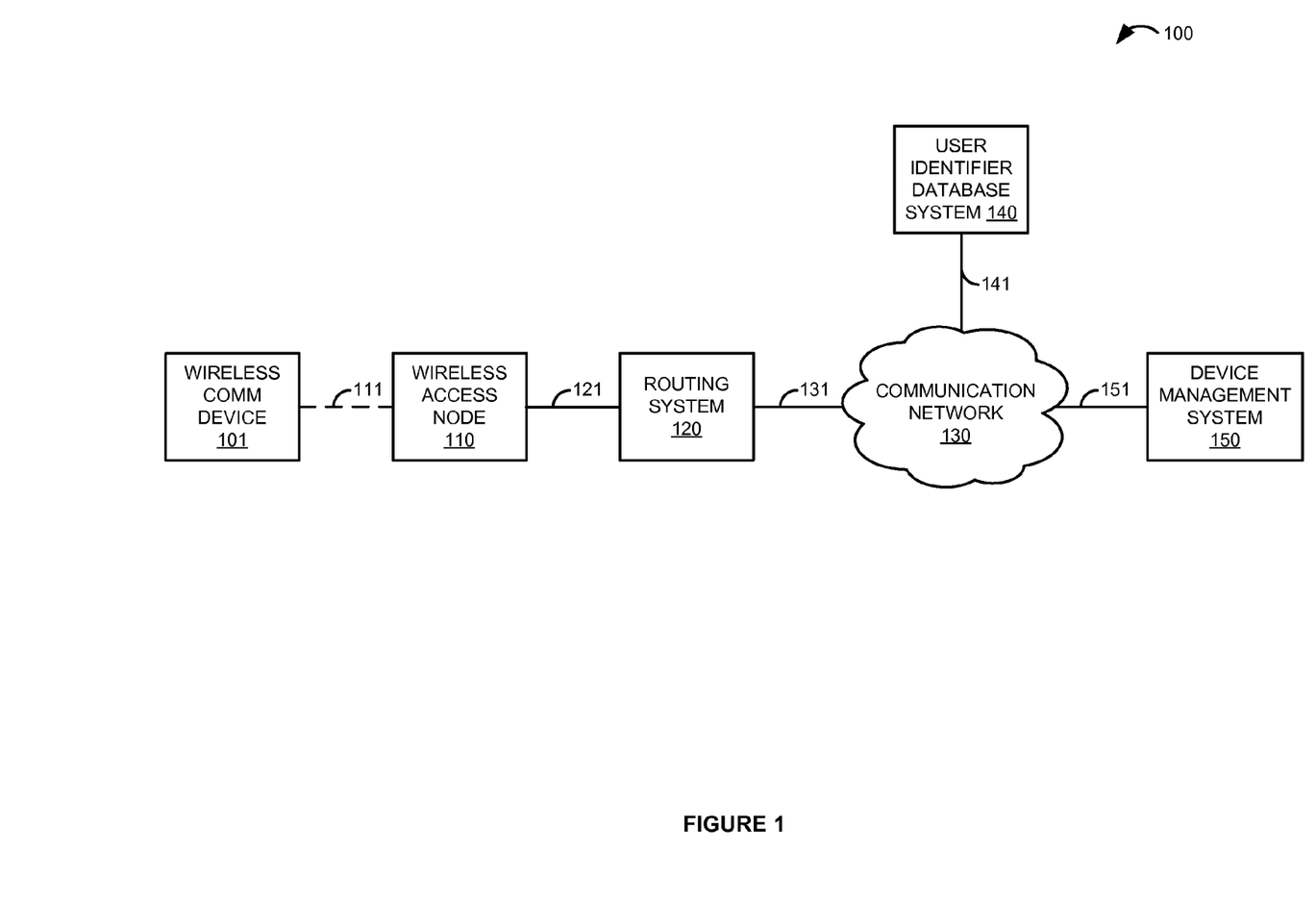
FIG. 1 is a block diagram that illustrates a communication system.

FIG. 1 is a block diagram that illustrates communication system 100. Communication system 100 includes wireless communication device 101, wireless access node 110, routing system 120, communication network 130, user identifier database system 140, and device management system 150. Wireless communication device 101 and wireless access node 110 are in communication over wireless communication link 111. Wireless access node 110 and routing system 120 communicate over communication link 121. Routing system 120 and communication network 130 communicate over communication link 131. Communication network 130 and user identifier database system 140 are in communication over communication link 141. Communication network 130 and device management system 150 communicate over communication link 151.

Figure 2A:
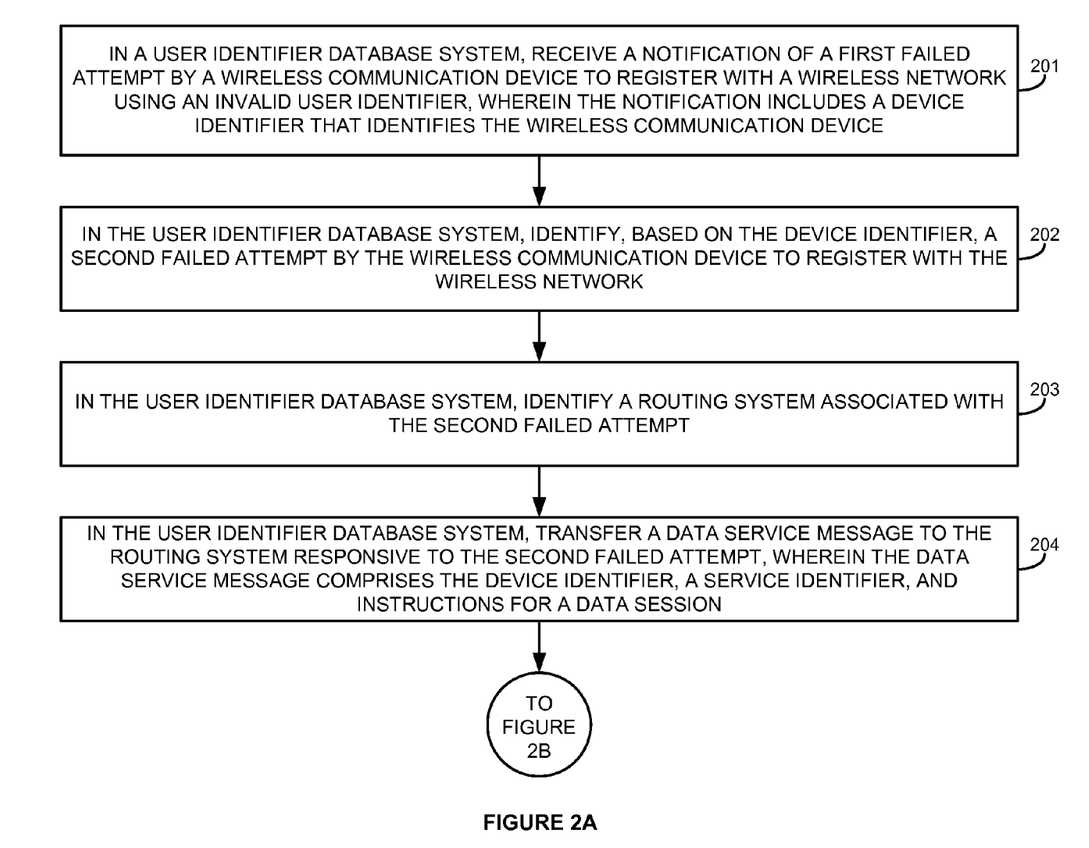
FIG. 2A is a flow diagram that illustrates an operation of the communication system.

FIG. 2A is a flow diagram that illustrates an operation of communication system 100. The steps of the operation are indicated below parenthetically. The operation of communication system 100 is continued in FIG. 2B. The exemplary operation shown in FIGS. 2A-2B assumes that wireless communication device 101 attempts to register with communication network 130 using an invalid user identifier.

In FIG. 2A, user identifier database system 140 receives a notification of a first failed attempt by wireless communication device 101 to register with communication network 130 using an invalid user identifier (201). Typically, the invalid user identifier is considered invalid if the user identifier cannot be used by communication network 130 to authenticate wireless communication device 101 for registration. In some examples, a user identifier could be rendered invalid if it is not associated with a device identifier of wireless communication device 101, if the user identifier is associated with a different user of communication network 130, if the user identifier is unknown to communication network 130 or unassigned, or for any other reason resulting in a user identifier that cannot be authenticated when presented by wireless communication device 101 during a registration attempt. For example, a user identifier could be rendered invalid if the user alters the user identifier stored in wireless communication device 101, or if a user identifier formerly assigned to the user has since been reassigned to a different user of communication network 130. In some examples, the invalid user identifier could comprise a Mobile Station Identifier (MSID), International Mobile Subscriber Identity (IMSI), Mobile Identification Number (MIN), User Identifier (UID), or some other identifier that typically identifies a user of communication network 130, but is invalid in this case and thus cannot be relied on by communication network 130 to allow device 101 to register.

The notification of the first failed attempt by wireless communication device 101 to register with communication network 130 includes a device identifier that identifies wireless communication device 101 (201). For example, the device identifier could comprise a Mobile Station International Subscriber Directory Number (MSISDN) or some other telephone number, Electronic Serial Number (ESN), Mobile Equipment Identifier (MEID), International Mobile Equipment Identity (IMEI), Media Access Control Identifier (MACID), or some other identifier that uniquely identifies wireless communication device 101—including combinations thereof.

After receiving the notification of the first failed attempt to register, user identifier database system 140 identifies, based on the device identifier, a second failed attempt by wireless communication device 101 to register with communication network 130 (202). Typically, user identifier database system 140 is configured to identify the second failed attempt by wireless communication device 101 to register with communication network 130 in response to the notification of the first failed attempt. In some examples, user identifier database system 140 may monitor device identifiers of wireless communication devices attempting to register with communication network 130 and wait for a second failed registration attempt by the device identifier associated with wireless communication device 101.

Responsive to identifying the second failed attempt by wireless communication device 101 to register with communication network 130, user identifier database system 140 identifies a routing system 120 associated with the second failed attempt (203). Typically, the routing system 120 associated with the second failed registration attempt comprises a communication system that wireless communication device 101 attempted to establish a communication session with during the second failed registration attempt. In some examples, routing system 120 could comprise a router, mobile switching center, service node, switching system, or any other communication system capable of routing communications.

Upon identifying the routing system 120 associated with the second failed attempt, user identifier database system 140 transfers a data service message to routing system 120 responsive to the second failed attempt (204). The data service message comprises the device identifier, a service identifier, and instructions for a data session (204). In some examples, the data service message could comprise a short message service delivery point-to-point (SMDPP) message. The service identifier could comprise any identifier, parameter, or other indicator that identifies a service for wireless communication device 101. The service identified by the service identifier typically comprises an application that utilizes a connection through communication network 130 to exchange information with wireless communication device 101. In some examples, the service identifier could comprise a teleservice ID. The instructions for the data session typically comprise commands intended for execution by wireless communication device 101, which are typically associated with the service identified by the service identifier. In some examples, the instructions for the data session comprise a wireless application protocol (WAP) push message. The operation of communication system 100 continues with the steps presented in FIG. 2B.

Figure 2B:
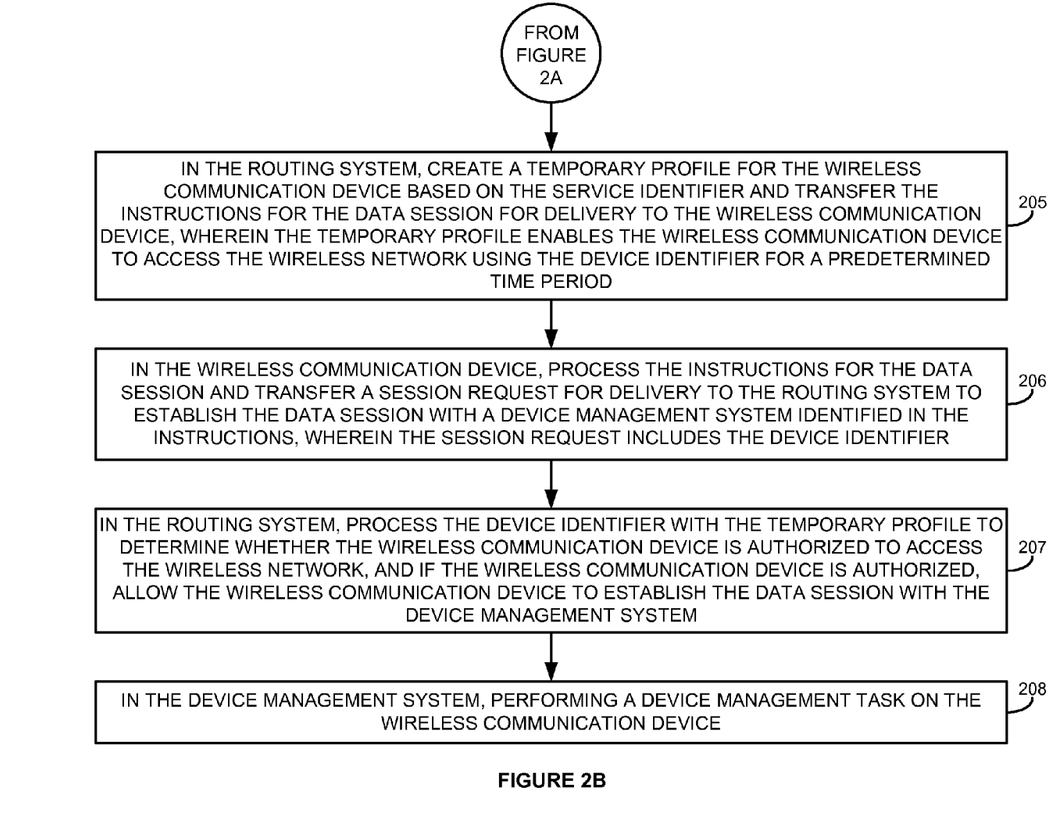
FIG. 2B is a continuation of the flow diagram of FIG. 2A that illustrates an operation of the communication system.

FIG. 2B is a continuation of the flow diagram of FIG. 2A that illustrates an operation of communication system 100. In FIG. 2B, responsive to receiving the data service message from user identifier database system 140, routing system 120 creates a temporary profile for wireless communication device 101 based on the service identifier and transfers the instructions for the data session for delivery to wireless communication device 101 (205). Routing system 120 typically creates the temporary profile for wireless communication device 101 by processing the service identifier to identify a service, and the service indicates that routing system 120 should create the temporary profile for device 101. The temporary profile enables wireless communication device 101 to access communication network 130 using the device identifier for a predetermined time period (205). For example, since the invalid user identifier presented by wireless communication device 101 during the first failed registration attempt cannot be used to successful authenticate and authorize device 101 for access to communication network 130, routing system 120 creates the temporary profile so device 101 can successfully register with communication network 130 without using the invalid user identifier. Wireless communication device 101 can then register with communication network 130 using the device identifier during the predetermined time period when the temporary profile remains active. Routing system 120 typically transfers the instructions for the data session for delivery to wireless communication device 101 after creating the temporary profile for device 101.

Wireless communication device 101 processes the instructions for the data session and transfers a session request for delivery to routing system 120 to establish the data session with device management system 150 identified in the instructions (206). The session request includes the device identifier (206). Typically, the instructions for the data session direct wireless communication device 101 to automatically transfer the session request for delivery to routing system 120 and to include the device identifier in the session request.

Responsive to receiving the session request, routing system 120 processes the device identifier with the temporary profile to determine whether wireless communication device 101 is authorized to access communication network 130 (207). Typically, routing system 120 compares the device identifier included in the session request to the device identifier enabled for access to communication network 130 in the temporary profile to determine whether wireless communication device 101 is authorized for access. For example, routing system 120 could determine that wireless communication device 101 is authorized to access communication network 130 if the device identifier in the session request matches the device identifier in the temporary profile and the predetermined time period has not expired. If routing system 120 determines that wireless communication device 101 is authorized to access communication network 130, routing system 120 allows wireless communication device 101 to establish the data session with device management system 150 (207).

Once the data session is established between device management system 150 and wireless communication device 101, device management system 150 performs a device management task on wireless communication device 101 (208). The device management task performed by device management system 150 could comprise any task related to managing wireless communication device 101, and could include provisioning, administration, programming, data erasing, or any other device management task. In some examples, performing the device management task on the wireless communication device comprises remotely erasing user data stored on wireless communication device 101, and/or programming a valid user identifier into wireless communication device 101. Typically, device management system 150 performs the device management task using over-the-air provisioning. For example, device management system 150 could utilize open mobile alliance device management (OMA-DM) and/or over-the-air service provisioning (OTASP) protocols to perform the device management task on wireless communication device 101.

Advantageously, the operation of communication system 100 shown in FIGS. 2A-2B enables communication network 130 to manage wireless communication device 101 over the air, even when device 101 has an invalid user identifier. By creating the temporary profile for wireless communication device 101 after device 101 fails to register using the invalid user identifier, routing system 120 provides a mechanism for device 101 to connect to communication network 130 using its device identifier. Once wireless communication device 101 successfully registers with communication network 130 using the temporary profile, the instructions for the data session received by wireless communication device 101 direct device 101 to establish a data session with device management system 150 identified in the instructions. Device management system 150 can then perform any device management task on wireless communication device 101 once the data session has been established. In this manner, device management system 150 may remotely erase confidential user data stored on wireless communication device 101 in an effort to protect the privacy of a user of device 101 and combat fraudulent device modifications.

Referring back to FIG. 1, wireless communication device 101 comprises any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1×RTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Bluetooth, Internet, telephony, or any other wireless network protocol that facilitates communication between wireless communication device 101 and wireless access node 110.

Wireless access node 110 comprises RF communication circuitry and an antenna. The RF communication circuitry typically includes an amplifier, filter, RF modulator, and signal processing circuitry. Wireless access node 110 may also comprise a router, server, memory device, software, processing circuitry, cabling, power supply, network communication interface, structural support, or some other communication apparatus. Wireless access node 110 could comprise a base station, Internet access node, telephony service node, wireless data access point, or some other wireless communication system—including combinations thereof. Some examples of wireless access node 110 include a base transceiver station (BTS), base station controller (BSC), radio base station (RBS), Node B, enhanced Node B (eNode B), and others. Wireless network protocols that may be utilized by wireless access node 110 include CDMA, GSM, UMTS, HSPA, EV-DO, EV-DO rev. A, 3GPP LTE, WiMAX, Wi-Fi, Bluetooth, Internet, telephony, or some other communication format—including combinations thereof.

Routing system 120 comprises a processing system and communication transceiver. Routing system 120 may also include other components such as a router, server, data storage system, and power supply. Routing system 120 may reside in a single device or may be distributed across multiple devices. Routing system 120 may be a discrete system or may be integrated within other systems—including other systems within communication system 100. In some examples, routing system 120 could comprise a mobile switching center, router, switching system, packet gateway, network gateway system, Internet access node, application server, service node, firewall, or some other communication system—including combinations thereof.

Communication network 130 represents the core network of a wireless communication provider, and could include routers, gateways, telecommunication switches, servers, processing systems, or other communication equipment and systems for providing communication and data services. Communication network 130 could comprise wireless communication nodes, telephony switches, Internet routers, network gateways, computer systems, communication links, or some other type of communication equipment—including combinations thereof. Communication network 130 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 130 may be configured to communicate over metallic, wireless, or optical links. Communication network 130 may be configured to use time-division multiplexing (TDM), Internet Protocol (IP), Ethernet, optical networking, wireless protocols, communication signaling, or some other communication format—including combinations thereof. In some examples, communication network 130 includes further access nodes and associated equipment for providing communication services to many wireless communication devices across a large geographic region.

User identifier database system 140 comprises a processing system and communication transceiver. User identifier database system 140 may also include other components such as a router, server, data storage system, and power supply. User identifier database system 140 may reside in a single device or may be distributed across multiple devices. User identifier database system 140 may be a discrete system or may be integrated within other systems—including other systems within communication system 100. In some examples, user identifier database system 140 could comprise a home location register, visitor location register, packet gateway, mobile switching center, network gateway system, Internet access node, application server, service node, firewall, or some other communication system—including combinations thereof.

Device management system 150 comprises a processing system and communication transceiver. Device management system 150 may also include other components such as a router, server, data storage system, and power supply. Device management system 150 may reside in a single device or may be distributed across multiple devices. Device management system 150 may be a discrete system or may be integrated within other systems—including other systems within communication system 100. In some examples, device management system 150 could comprise an OMA-DM application server, packet gateway, mobile switching center, network gateway system, Internet access node, server, service node, firewall, or some other communication system—including combinations thereof.

Wireless communication link 111 uses the air or space as the transport medium. Wireless communication link 111 may use various protocols, such as CDMA, GSM, UMTS, HSPA, EV-DO, EV-DO rev. A, 3GPP LTE, WiMAX, Wi-Fi, Bluetooth, Internet, telephony, or some other communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication links 121, 131, 141, and 151 use metal, air, space, optical fiber such as glass or plastic, or some other material as the transport media—including combinations thereof. Communication links 121, 131, and 151 could use various communication protocols, such as TDM, IP, Ethernet, telephony, optical networking, hybrid fiber coax (HFC), communication signaling, wireless protocols, or some other communication format—including combinations thereof. Communication links 121, 131, 141, and 151 may be direct links or could include intermediate networks, systems, or devices.

Figure 3:
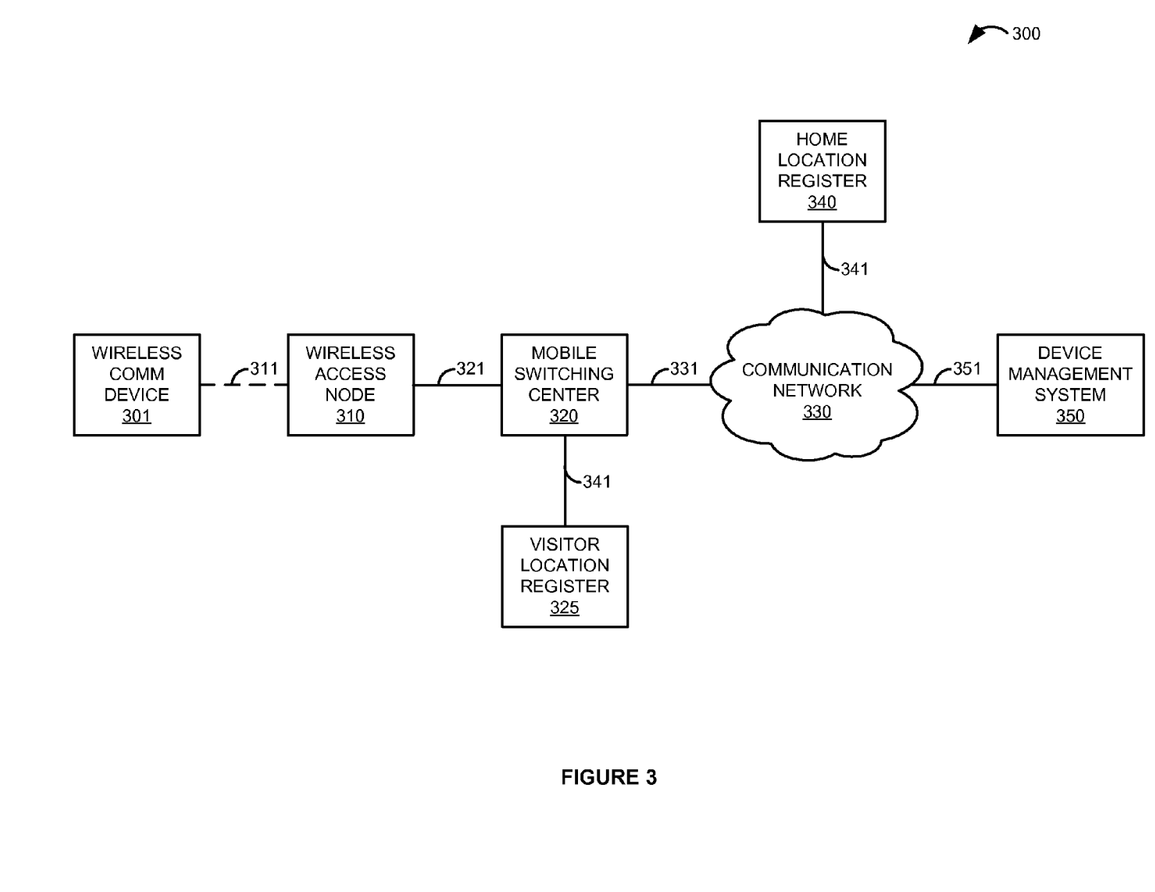
FIG. 3 is a block diagram that illustrates a communication system in an exemplary embodiment.

FIG. 3 is a block diagram that illustrates communication system 300. Communication system 300 includes wireless communication device 301, wireless access node 310, mobile switching center (MSC) 320, visitor location register (VLR) 325, communication network 330, home location register (HLR) 340, and device management system 350. Wireless communication device 301 and wireless access node 310 communicate over wireless communication link 311. Wireless access node 310 and MSC 320 are in communication over communication link 321. MSC 320 and communication network 330 communicate over communication link 331. MSC 320 and VLR 325 are in communication over communication link 341. Communication network 330 and HLR 340 communicate over communication link 341. Communication network 330 and device management system 350 are in communication over communication link 351.

Figure 4:
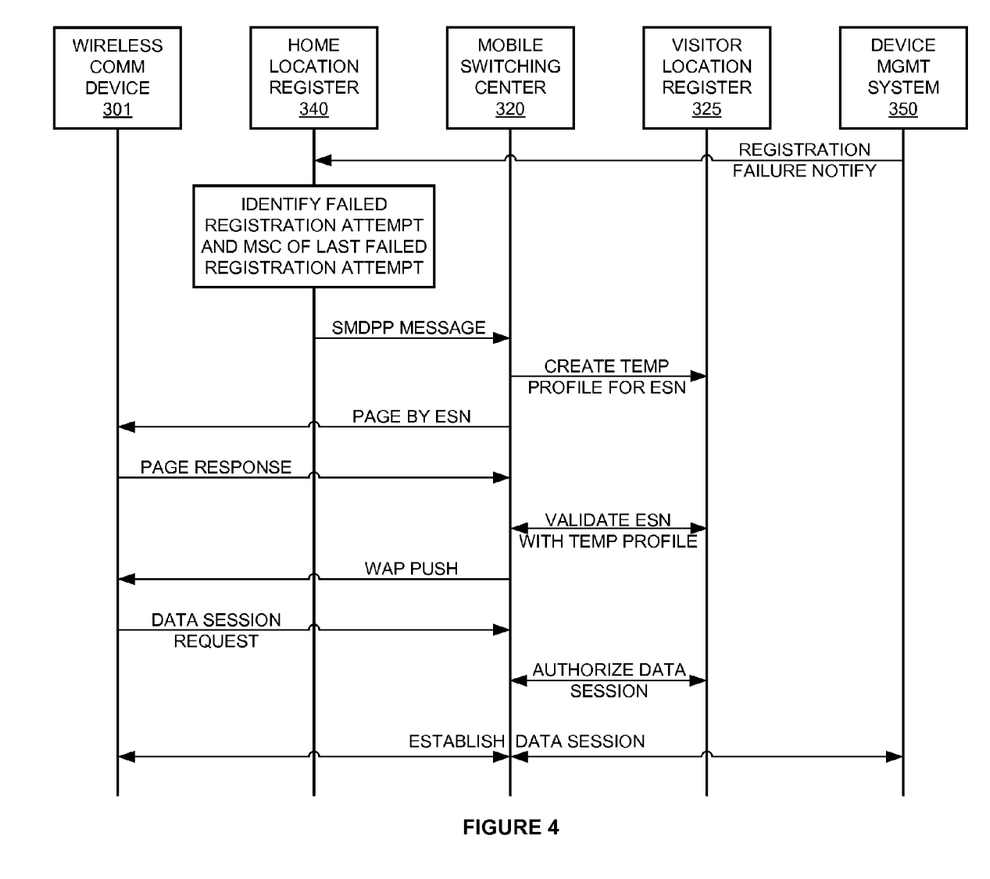
FIG. 4 is a sequence diagram that illustrates an operation of the communication system in an exemplary embodiment.

FIG. 4 is a sequence diagram that illustrates an operation of communication system 300 in an exemplary embodiment. In this example, HLR 340 stores valid MSID and ESN and/or MEID combinations to authenticate wireless communication devices for access to communication network 330. Wireless communication device 301 is programmed with an MSID that does not match the ESN and/or MEID of device 301 according to the information stored in HLR 340. Thus, when a user of wireless communication device 301 attempts to register with communication network 330 via MSC 320, device 301 cannot be authenticated and fails registration.

As shown in FIG. 4, when wireless communication device 301 fails to register with communication network 330, device management system 350 transfers a registration failure notification to HLR 340. The registration failure notification includes the ESN/MEID of wireless communication device 301. Upon receipt of the notification of the failed registration attempt, HLR 340 identifies MSC 320 as being associated with the last failed registration attempt. In some examples, HLR 340 could identify that MSC 320 was serving wireless communication device 301 for the first failed registration attempt, or HLR 340 could monitor for registration attempts by the ESN/MEID of wireless communication device 301 and wait for a second failed registration attempt by device 301. Regardless, once HLR 340 has identified MSC 320, HLR 340 sends a Short Message Service Delivery Point-to-Point (SMDPP) message over the SS7 signaling network for delivery to MSC 320. This SMDPP message includes the ESN/MEID of wireless communication device 301, along with a Teleservice ID. The Teleservice ID is a standard parameter defined by the IS-41 standard. In this case, a private Teleservice ID could be defined or a new public Teleservice ID could be reserved to support the functionality described herein.

Responsive to receiving the SMDPP message from HLR 340, MSC 320 processes the SMDPP message and extracts the Teleservice ID. MSC 320 then processes the Teleservice ID to identify the service indicated by the Teleservice ID received in the SMDPP message. In addition, MSC 320 extracts the ESN/MEID from the SMDPP message and uses this information to create a temporary profile for wireless communication device 301. MSC 320 then stores the temporary profile in its VLR 325. The temporary profile allows wireless communication device 301 to become valid for a predetermined length of time specified by an internal variable within MSC 320. When the temporary profile is active, MSC 320 will allow service to wireless communication device 301 based on the ESN/MEID provided by device 301 during a registration attempt, regardless of the MSID that may be programmed into device 301 and possibly included in messages sent between MSC 320 and device 301.

In this example, the SMDPP message received by MSC 320 also includes a User Data parameter as defined in the IS-41 standard. MSC 320 processes the User Data as it typically would for a wireless communication device with a valid MSID and ESN/MEID. However, in this case MSC 320 presents the User Data to wireless communication device 301 using only the ESN or MEID since the MSID is invalid or unknown. Thus, MSC 320 utilizes only the ESN or MEID on the CDMA Paging Channel as defined in the CDMA2000 standards in order to page wireless communication device 301. All subsequent communication between wireless communication device 301 and MSC 320 will utilize the ESN or MEID for validation, ensuring that device 301 is allowed service for the duration of the timer defined in MSC 320 for the temporary profile. Wireless communication device 301 responds to the page from MSC 320 by transferring a page response for delivery to MSC 320. When MSC 320 receives the page response from wireless communication device 301, MSC 320 validates device 301 using the ESN/MEID and the temporary profile stored in VLR 325.

In this example, a direct OMA-DM request for wireless communication device 301 was issued in the SMDPP message received by MSC 320 from HLR 340. Thus, the User Data parameter in the SMDPP message includes a WAP Push message in this case. MSC 320 transfers the WAP Push message for delivery to wireless communication device 301. The WAP Push message instructs wireless communication device 301 to establish a data session with communication network 330 and connect to device management system 350 identified in the message. In response to the WAP Push message, wireless communication device 301 transfers a request for a data session to MSC 320. MSC 320 receives the data session request and queries VLR 325 with the ESN/MEID of wireless communication device 301 to authorize the data session using the temporary profile for device 301. Upon successful validation, MSC 320 establishes the data session between wireless communication device 301 and device management system 350.

Advantageously, MSC 320 allows the data connection between wireless communication device 301 and device management system 350 even though device 301 is only validated based on its ESN/MEID, and was not authorized in the typical manner using a valid MSID and ESN/MEID pair. Device management system 350 can then perform any device management task on wireless communication device 301 using over-the-air (OTA) provisioning following the OMA-DM or OTASP protocols. For example, wireless communication device 301 could have gone unused for a long period of time and the MSID stored in device 301 has since been reassigned to a different user. In this case, wireless communication device 301 cannot be validated using this reassigned MSID when requesting service on communication network 330 because the MSID is associated with a different ESN/MEID than device 301. If the user of wireless communication device 301 attempts to re-establish service for device 301, the operations described herein could enable device management system 350 to automatically assign a new MSID to device 301 using OTA provisioning, instead of requiring the user of device 301 to manually contact personnel at communication network 330 to request the new MSID. As another example, an individual could alter the MSID in wireless communication device 301 so that communication network 330 cannot identify, validate, and communicate with device 301 based the MSID and ESN/MEID stored in HLR 340. The operations described herein enable device management system 350 to remotely erase data stored on wireless communication device 301 using OTA protocols, thereby preserving the user's privacy by removing sensitive or classified information from device 301, such as the user's contact information, passwords, and other user data.

Figure 5:
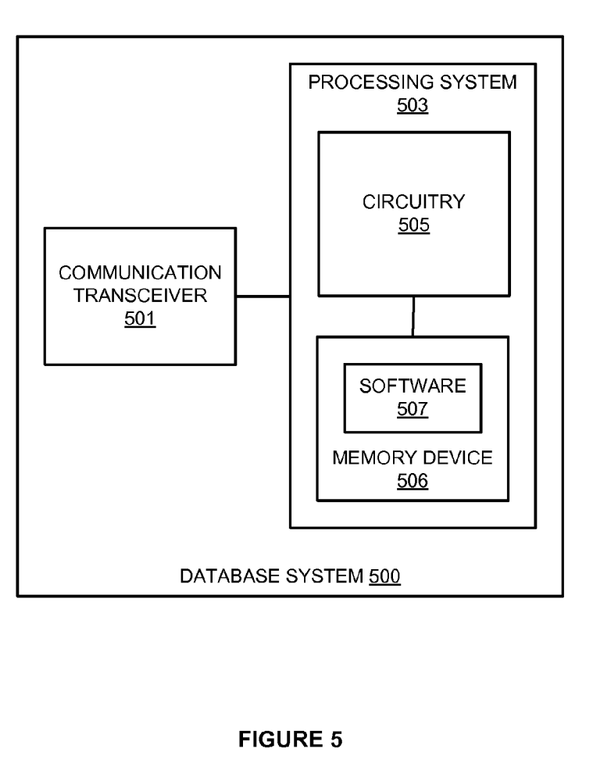
FIG. 5 is a block diagram that illustrates a database system.

FIG. 5 is a block diagram that illustrates database system 500. Database system 500 provides an example of user identifier database system 140, although system 140 may use alternative configurations. Database system 500 comprises communication transceiver 501 and processing system 503. Processing system 503 is linked to communication transceiver 501. Processing system 503 includes processing circuitry 505 and memory device 506 that stores operating software 507.

Communication transceiver 501 comprises components that communicate over communication links, such as network cards, ports, RF transceivers, processing circuitry and software, or some other communication components. Communication transceiver 501 may be configured to communicate over metallic, wireless, or optical links. Communication transceiver 501 may be configured to use TDM, IP, Ethernet, optical networking, wireless protocols, communication signaling, or some other communication format—including combinations thereof. Communication transceiver 501 could be configured to receive a notification of a first failed attempt by a wireless communication device to register with a communication network using an invalid user identifier, wherein the notification includes a device identifier that identifies the wireless communication device. In addition, communication transceiver 501 could be configured to transfer a data service message for delivery to a routing system responsive to a second failed attempt by the wireless communication device to register with the communication network, wherein the data service message comprises the device identifier, a service identifier, and instructions for a data session.

Processing circuitry 505 comprises microprocessor and other circuitry that retrieves and executes operating software 507 from memory device 506. Memory device 506 comprises a disk drive, flash drive, data storage circuitry, or some other memory apparatus. Operating software 507 comprises computer programs, firmware, or some other form of machine-readable processing instructions. Operating software 507 may include an operating system, utilities, drivers, network interfaces, applications, or some other type of software.

When executed by circuitry 505, operating software 507 directs processing system 503 to operate as described herein for user identifier database system 140. In particular, operating software 507 may direct processing system 503 to direct communication transceiver 501 to receive a notification of a first failed attempt by a wireless communication device to register with a communication network using an invalid user identifier, wherein the notification includes a device identifier that identifies the wireless communication device. In addition, operating software 507 directs processing system 503 to identify, based on the device identifier, a second failed attempt by the wireless communication device to register with the communication network, to identify a routing system associated with the second failed attempt, and to transfer a data service message for delivery to the routing system responsive to the second failed attempt, wherein the data service message comprises the device identifier, a service identifier, and instructions for a data session. Further, operating software 507 may direct processing system 503 to direct communication transceiver 501 to transfer the data service message for delivery to the routing system responsive to the second failed attempt.

In some examples, operating software 507 could comprise a failed registration software module that receives a notification of a first failed attempt by a wireless communication device to register with a communication network using an invalid user identifier, wherein the notification includes a device identifier that identifies the wireless communication device. Additionally, operating software 507 could comprise an identification software module that identifies, based on the device identifier, a second failed attempt by the wireless communication device to register with the communication network, and identifies a routing system associated with the second failed attempt. Finally, operating software 507 could comprise a data service messaging software module that transfers a data service message for delivery to the routing system responsive to the second failed attempt, wherein the data service message comprises the device identifier, a service identifier, and instructions for a data session.

Figure 6:
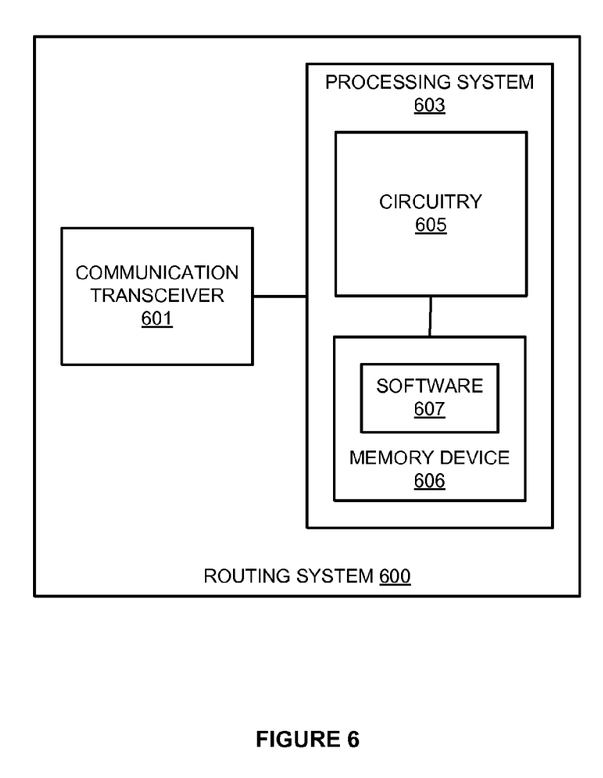
FIG. 6 is a block diagram that illustrates a routing system.

FIG. 6 is a block diagram that illustrates routing system 600. Routing system 600 provides an example of routing system 120, although system 120 may use alternative configurations. Routing system 600 comprises communication transceiver 601 and processing system 603. Processing system 603 is linked to communication transceiver 601. Processing system 603 includes processing circuitry 605 and memory device 606 that stores operating software 607.

Communication transceiver 601 comprises components that communicate over communication links, such as network cards, ports, RF transceivers, processing circuitry and software, or some other communication components. Communication transceiver 601 may be configured to communicate over metallic, wireless, or optical links. Communication transceiver 601 may be configured to use TDM, IP, Ethernet, optical networking, wireless protocols, communication signaling, or some other communication format—including combinations thereof. In some examples, communication transceiver 601 could be configured to receive a data service message comprising a device identifier, a service identifier, and instructions for a data session, and to receive a session request transmitted from a wireless communication device.

Processing circuitry 605 comprises microprocessor and other circuitry that retrieves and executes operating software 607 from memory device 606. Memory device 606 comprises a disk drive, flash drive, data storage circuitry, or some other memory apparatus. Operating software 607 comprises computer programs, firmware, or some other form of machine-readable processing instructions. Operating software 607 may include an operating system, utilities, drivers, network interfaces, applications, or some other type of software.

When executed by circuitry 605, operating software 607 directs processing system 603 to operate as described herein for routing system 120. In particular, operating software 607 may direct processing system 603 to direct communication transceiver 601 to receive a data service message comprising a device identifier, a service identifier, and instructions for a data session transmitted from a home location register or database system. Further, operating software 607 directs processing system 603 to create a temporary profile for the wireless communication device based on the service identifier and transfer the instructions for the data session for delivery to the wireless communication device, wherein the temporary profile enables the wireless communication device to access the communication network using the device identifier for a predetermined time period. Additionally, operating software 607 directs processing system 603 to process the device identifier with the temporary profile to determine whether the wireless communication device is authorized to access the communication network, and if the wireless communication device is authorized, to allow the wireless communication device to establish the data session with a device management system.

In some examples, operating software 607 could comprise a profile generator software module that creates a temporary profile for a wireless communication device based on a service identifier and transfers instructions for a data session for delivery to the wireless communication device, wherein the temporary profile enables the wireless communication device to access a communication network using a device identifier for a predetermined time period. Additionally, operating software 607 could comprise a profile validation software module that processes a device identifier with a temporary profile to determine whether a wireless communication device is authorized to access a communication network, and if the wireless communication device is authorized, to allow the wireless communication device to establish a data session with a device management system.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, the method comprising:
   in a user identifier database system, receiving a notification of a first failed attempt by a wireless communication device to register with a communication network using an invalid user identifier, wherein the notification includes a device identifier that identifies the wireless communication device;
   in the user identifier database system, identifying, based on the device identifier, a second failed attempt by the wireless communication device to register with the communication network, identifying a routing system associated with the second failed attempt, and transferring a data service message for delivery to the routing system responsive to the second failed attempt, wherein the data service message comprises the device identifier, a service identifier, and instructions for a data session;
   in the routing system, creating a temporary profile for the wireless communication device based on the service identifier and transferring the instructions for the data session for delivery to the wireless communication device, wherein the temporary profile enables the wireless communication device to access the communication network using the device identifier for a predetermined time period;
   in the wireless communication device, processing the instructions for the data session and transferring a session request for delivery to the routing system to establish the data session with a device management system identified in the instructions, wherein the session request includes the device identifier;
   in the routing system, processing the device identifier with the temporary profile to determine whether the wireless communication device is authorized to access the communication network, and if the wireless communication device is authorized, allowing the wireless communication device to establish the data session with the device management system; and
   in the device management system, performing a device management task on the wireless communication device.

2. The method of claim 1 wherein performing the device management task on the wireless communication device comprises remotely erasing user data stored on the wireless communication device.

3. The method of claim 1 wherein performing the device management task on the wireless communication device comprises programming a valid user identifier into the wireless communication device.

4. The method of claim 3 wherein programming the valid user identifier into the wireless communication device comprises programming the valid user identifier into the wireless communication device using over-the-air provisioning.

5. The method of claim 1 wherein the device identifier that identifies the wireless communication device comprises an electronic serial number and wherein the routing system comprises a mobile switching center.

6. The method of claim 1 wherein transferring the data service message for delivery to the routing system comprises transferring a short message service delivery point-to-point message for delivery to the routing system.

7. The method of claim 1 wherein the service identifier of the data service message comprises a teleservice ID and wherein the instructions for the data session comprise a wireless application protocol push message.

8. A communication system comprising:
   a user identifier database system configured to receive a notification of a first failed attempt by a wireless communication device to register with a communication network using an invalid user identifier, wherein the notification includes a device identifier that identifies the wireless communication device;
   the user identifier database system configured to identify, based on the device identifier, a second failed attempt by the wireless communication device to register with the communication network, to identify a routing system associated with the second failed attempt, and to transfer a data service message for delivery to the routing system responsive to the second failed attempt, wherein the data service message comprises the device identifier, a service identifier, and instructions for a data session;
   the routing system configured to create a temporary profile for the wireless communication device based on the service identifier and transfer the instructions for the data session for delivery to the wireless communication device, wherein the temporary profile enables the wireless communication device to access the communication network using the device identifier for a predetermined time period;
   the wireless communication device configured to process the instructions for the data session and transfer a session request for delivery to the routing system to establish the data session with a device management system identified in the instructions, wherein the session request includes the device identifier;
   the routing system configured to process the device identifier with the temporary profile to determine whether the wireless communication device is authorized to access the communication network, and if the wireless communication device is authorized, to allow the wireless communication device to establish the data session with the device management system; and the device management system configured to perform a device management task on the wireless communication device.

9. The system of claim 8 wherein the device management system configured to perform the device management task on the wireless communication device comprises the device management system configured to remotely erase user data stored on the wireless communication device.

10. The system of claim 8 wherein the device management system configured to perform the device management task on the wireless communication device comprises the device management system configured to program a valid user identifier into the wireless communication device.

11. The system of claim 10 wherein the device management system configured to program the valid user identifier into the wireless communication device comprises the device management system configured to program the valid user identifier into the wireless communication device using over-the-air provisioning.

12. The system of claim 8 wherein the device identifier that identifies the wireless communication device comprises an electronic serial number and wherein the routing system comprises a mobile switching center.

13. The system of claim 8 wherein the user identifier database system configured to transfer the data service message for delivery to the routing system comprises the user identifier database system configured to transfer a short message service delivery point-to-point message for delivery to the routing system.

14. The system of claim 8 wherein the service identifier of the data service message comprises a teleservice ID and wherein the instructions for the data session comprise a wireless application protocol push message.

15. A method of operating a communication system, the method comprising:

in a database system, identifying a failed registration attempt by a wireless communication device to register with a communication network based on a device identifier that identifies the wireless communication device;

in the database system, identifying a routing system associated with the failed registration attempt, and transferring a data service message for delivery to the routing system responsive to the failed registration attempt, wherein the data service message comprises the device identifier, a service identifier, and instructions for a data session;

in the routing system, creating a temporary profile for the wireless communication device based on the service identifier and transferring the instructions for the data session for delivery to the wireless communication device, wherein the temporary profile enables the wireless communication device to access the communication network using the device identifier for a predetermined time period;

in the wireless communication device, processing the instructions for the data session and transferring a session request for delivery to the routing system to establish the data session with a device management system identified in the instructions, wherein the session request includes the device identifier;

in the routing system, processing the device identifier with the temporary profile to determine whether the wireless communication device is authorized to access the communication network, and if the wireless communication device is authorized, allowing the wireless communication device to establish the data session with the device management system; and in the device management system, remotely erasing user data stored on the wireless communication device.

16. The method of claim 15 wherein remotely erasing the user data stored on the wireless communication device comprises remotely erasing user contact information stored on the wireless communication device.

17. The method of claim 15 wherein remotely erasing the user data stored on the wireless communication device comprises remotely erasing the user data using an open mobile alliance device management protocol.

18. The method of claim 15 wherein the device identifier that identifies the wireless communication device comprises an electronic serial number and wherein the routing system comprises a mobile switching center.

19. The method of claim 15 wherein transferring the data service message for delivery to the routing system comprises transferring a short message service delivery point-to-point message for delivery to the routing system.

20. The method of claim 15 wherein the service identifier of the data service message comprises a teleservice ID and wherein the instructions for the data session comprise a wireless application protocol push message.

* * * * *